(12) United States Patent
Koltsidas et al.

(10) Patent No.: US 10,503,590 B2
(45) Date of Patent: Dec. 10, 2019

(54) STORAGE ARRAY COMPRISING A HOST-OFFLOADED STORAGE FUNCTION

(71) Applicant: International Business Machines Corporation, Armonk, NY (US)

(72) Inventors: Ioannis Koltsidas, Zurich (CH); Nikolas Ioannou, Zurich (CH); Robert Haas, Adliswil (CH); Charalampos Pozidis, Thalwil (CH); Thomas D. Weigold, Thalwil (CH); Thomas P. Parnell, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 15/710,881

(22) Filed: Sep. 21, 2017

(65) Prior Publication Data

US 2019/0087268 A1 Mar. 21, 2019

(51) Int. Cl.
*G06F 11/00* (2006.01)
*G06F 11/10* (2006.01)
*G06F 3/06* (2006.01)

(52) U.S. Cl.
CPC ........ *G06F 11/1076* (2013.01); *G06F 3/0613* (2013.01); *G06F 3/0619* (2013.01); *G06F 3/0635* (2013.01); *G06F 3/067* (2013.01)

(58) Field of Classification Search
CPC .................................................. G06F 11/1076
USPC .... 714/5.11, 6.1, 6.11, 6.12, 6.13, 6.2, 6.21, 714/6.22, 6.23, 6.24
See application file for complete search history.

(56) References Cited

U.S. PATENT DOCUMENTS

| | | | |
|---|---|---|---|
| 6,721,317 B2 | 4/2004 | Chong, Jr. | |
| 9,104,326 B2 | 8/2015 | Frank et al. | |
| 9,112,890 B1 | 8/2015 | Ori | |
| 9,229,901 B1* | 1/2016 | Nesbit | G06F 15/17331 |
| 9,274,720 B1 | 3/2016 | Ori | |
| 2008/0256183 A1* | 10/2008 | Flynn | G06F 3/0613 709/204 |
| 2014/0317206 A1 | 10/2014 | Lomelino et al. | |
| 2016/0034419 A1 | 2/2016 | Romem et al. | |
| 2016/0036913 A1 | 2/2016 | Romem et al. | |

* cited by examiner

*Primary Examiner* — Dieu Minh T Le
(74) *Attorney, Agent, or Firm* — Stephen R. Yoder; Gilbert Harmon, Jr.

(57) ABSTRACT

The invention relates to a storage system comprising one or more storage controllers, two or more storage devices and two or more storage clients, the storage controllers, the storage devices and the storage clients being coupled via a network in order to exchange information between the storage controllers, said storage devices and said storage clients, wherein each storage client is adapted to provide data-path-storage commands to the storage devices via the network bypassing the storage controllers, wherein the storage system is adapted to provide data redundancy using a data redundancy scheme higher than RAID 1.

20 Claims, 7 Drawing Sheets ial limitation that the processing capabilities of the storage array do not scale with the aggregate performance of the storage drives. For example, as the number of drives (HDDs or SSDs) that are attached to the array increases (and therefore their aggregate throughput increases) the processing capabilities of the storage controllers remain the same. The same occurs as the storage drives are becoming faster, e.g., when using high-performance NVMe SSDs.

STORAGE ARRAY COMPRISING A HOST-OFFLOADED STORAGE FUNCTION

BACKGROUND

The present document relates to a system and a method for storing data. More specifically, the present document relates to a storage system architecture with separated data and control paths which provides efficient redundancy.

Traditional storage arrays follow an architecture that enables the storage array to employ two or more storage controllers which access the storage drives (HDDs or SSDs) over a storage bus. The controllers are equipped with CPU resources, memory, as well as custom hardware (e.g., FPGAs or ASICs). Using these resources, the controllers implement the storage functions, including virtualization, redundancy (e.g., RAID), fault tolerance, high-availability, storage protocols, volume reservations, and the processing of user requests in the data path. The storage clients (also called server computers or simply servers) access the storage resources (e.g., volumes) over a network, using the storage protocols that the storage array controllers implement. Therefore, all the processing of the user I/O requests occurs in the storage array controllers.

While such architectures have served well for more than 20 years, they suffer from the architectural limitation that the processing capabilities of the storage array do not scale with the aggregate performance of the storage drives. For example, as the number of drives (HDDs or SSDs) that are attached to the array increases (and therefore their aggregate throughput increases) the processing capabilities of the storage controllers remain the same. The same occurs as the storage drives are becoming faster, e.g., when using high-performance NVMe SSDs.

SUMMARY

In one aspect, the present disclosure refers to a storage system comprising one or more storage controllers, two or more storage devices and two or more storage clients. The storage controllers, the storage devices and the servers are coupled via a network in order to exchange information between said storage controllers, said storage devices and said storage clients. Each storage client is adapted to provide data-path-storage commands to the storage devices via the network bypassing the storage controllers. The storage system is adapted to provide data redundancy using a data redundancy scheme higher than RAID 1 i.e. a data redundancy scheme providing a protection level above (better than) RAID1.

According to a further aspect of the present invention, a method for data storage in a storage system comprising one or more storage controllers, two or more storage devices and two or more storage clients is provided. The storage controllers, the storage devices and the storage clients are coupled via a network in order to exchange information between said storage controllers, said storage devices and said storage clients. The method comprises the steps of: providing data-path-storage commands by the storage clients to the storage devices via the network bypassing the storage controllers, implementing data redundancy using a data redundancy scheme higher than RAID 1.

According to a further aspect of the current invention, a computer program product for data storage is provided. The computer program product comprises a computer readable storage medium having program instructions embodied therewith, the program instructions being executable by a processor to cause the processor to execute the method for data storage as indicated above.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
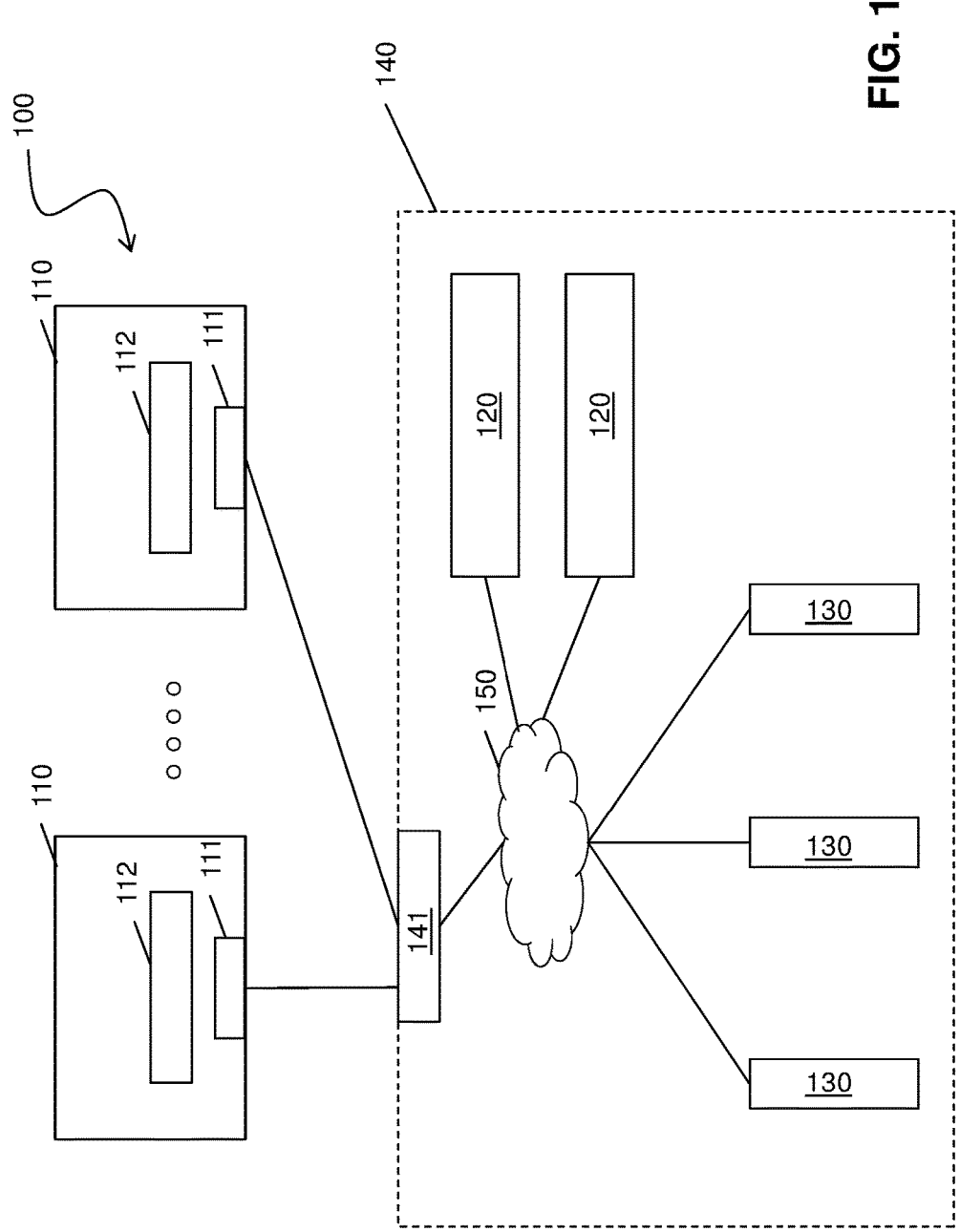
FIG. 1 illustrates a basic and schematic illustration of a storage system.

Server computers are equipped with storage resources themselves, and perform storage functions on their own. That is, there are no dedicated storage controllers; rather, special software running on the servers implements the storage functionality. This software can be a dedicated storage system software (e.g., CEPH), or be part of the application running on these servers. The instances of the storage software running on the different servers communicate with one another over a standard server network. The software ensures that the storage system can tolerate hardware and software faults, by replicating (or erasure-coding, etc.) blocks of data across the network to the storage drives of multiple servers. The servers also communicate with one another over the network to synchronize accesses to storage (e.g., when applications running on different servers access the same logical blocks).

An advantage of this architecture is that it can be scalable in terms of capacity: by just adding more and more servers with direct-attached drives, one can increase the capacity arbitrarily. At the same time, however, this architecture comes with some disadvantages, which limit its applicability. First, one has to scale compute resources with storage resources. When more capacity is needed, it will have to come with more compute resources. When more CPU power is needed by the application, more storage resources will have to come with it. Second, the 2-way or 3-way replication typically required to ensure fault-tolerance increases the total data footprint, and, hence, the cost of the system. Third, the additional communication required between the servers to implement the storage functions limits the performance scalability of the system, both in terms of latency and in terms of throughput; more so as the logical storage resources are shared and accessed concurrently by the server computers. Another disadvantage is that the compute and storage resource failures are no longer independent: when the CPU of a server fails or the software running on the server crashes, then the locally-attached storage resources cannot be accessed anymore and therefore fail with the rest of that server. When the storage resources fail, then the compute resources of the server can no longer be taken advantage of. In both cases, the software that implements the storage function needs to take all the measures required to continue operation (e.g., rebuild the data on some other node(s) and re-distribute data across the network, etc. etc.). What is more, the application needs to be able to handle these scenarios and gracefully migrate from the failed server node to some other server node.

Embodiments of the present invention improves the art of storage by removing the aforementioned limitations. Embodiments of the present invention comprise the following characteristics: (i) The control path and data path operations comprising the storage functions are separated. Typical control path operations include the provisioning of resources, access control, management operations, monitoring, responding to hardware and software failures, and in general operations that do not have to be processed on a per-I/O request basis. On the other hand, data path operations are the ones that essentially implement the I/O request processing such as routing a request targeting a logical address to the correct physical address on the correct storage drive, adding redundancy such as RAID parity to write requests, and more generally operations that need to be accomplished on a per-request basis; (ii) The server computers, the storage controllers and the drives are interconnected via a network fabric that allows the servers to access the drives directly and execute I/O operations using the physical addresses of data blocks. The same holds naturally for the storage controllers; and (iii) The servers run a custom driver for the storage that implements data-path storage functions, while the storage controllers implement the control path functions.

The advantage of such architectures is that performance scalability can be achieved by adding more server computers. In this case, the storage controllers only perform operations in the control path, and therefore do not pose a performance bottleneck in the data path. On the other hand, storage controllers appropriately handle fault tolerance and high availability, so that failures in the storage drives, in the storage controllers or in the server computers do not impact access to the storage (unless there are too many of them, of course).

Typical implementations of embodiments of the present invention employ a remote direct memory access (RDMA) enabled network (such as Ethernet (RoCE) or Infiniband) for the communication between the servers and the storage enclosure. Within the storage enclosure a PCIe network is used to connect the drives, the network interfaces (NICs) and the storage controllers. It is also typical that NVMe drives are used. Thus, the servers communicate with the storage enclosure using the NVMe-over-Fabrics protocol (or a variation there-of). Inside the storage enclosure, the NVMe (over PCIe) protocol is used for accessing the drives. Following this architecture, the storage controllers access the drives using NVMe (over PCIe). When the servers access the drives, the NIC translates the NVMe-over-Fabrics commands to NVMe (over PCIe) and they are forwarded to the drive. Typically, the storage enclosure employs multiple NICs for redundancy and high availability.

According to an example embodiment of the storage system, the storage controller comprises a data redundancy engine for implementing the data redundancy scheme. The data redundancy engine can be, for example, a RAID engine. At least some of the redundancy engine entities included in the data redundancy engine can be implemented by a hardware entity. Thereby, the storage clients can be unburdened from implementing the data redundancy scheme.

According to an example embodiment of the storage system, data-path-storage commands referring to a read operation are directly provided from the storage client to the storage device whereas data-path-storage commands referring to a write operation are provided from the storage client to the storage device via the storage controller in order to implement the data redundancy scheme to data to be written into the storage. So in other words, read and write data path operations within the storage system are handled differently, wherein read operations are directly provided to the storage devices thereby bypassing the storage controller and write operations are initiated by the storage clients but executed by the one or more storage controllers. Thereby read data path processing can be offloaded from the storage controllers.

According to embodiments of the present invention, the data redundancy engine of the storage controller comprises a RAID engine implementing RAID 5 or RAID 6 data redundancy scheme. Thereby a space-efficient data redundancy scheme can be provided.

According to an example embodiment of the storage system, the data redundancy engine comprises a hardware portion for calculating an erasure code. More in detail, the data redundancy engine can comprise a hardware portion (e.g. XOR-hardware) adapted to calculate parity information for implementing RAID 5 or RAID 6 data redundancy scheme. Thereby the performance of the data redundancy engine can be increased.

According to an example embodiment of the storage system, the storage clients comprise a data redundancy engine for implementing the data redundancy scheme. Thereby, the performance of the storage controllers can be increased.

According to an example embodiment of the storage system, the data redundancy engine of the storage clients comprises a RAID engine implementing RAID 5 or RAID 6 data redundancy scheme. Thereby a space-efficient data redundancy scheme can provided.

According to an example embodiment of the storage system, the data redundancy engine comprises a hardware portion for calculating an erasure code, specifically for calculating parity information for implementing RAID 5 or RAID 6 data redundancy scheme. Thereby the performance of the data redundancy engine can be increased.

According to an example embodiment of the storage system, the storage client is adapted to aggregate data in order to form data segments. The data segments can be equivalent to RAID stripes or a multiple of RAID stripes. Thus, the storage client is adapted to aggregate and buffer data to be written into the storage devices as long as a data segment is completely filled up and the data segment can be completely written to the storage devices. Thereby the efficiency of write operations can be significantly increased.

According to an example embodiment of the storage system, the storage client is adapted to apply a data redundancy scheme to the respective data segment, specifically, the storage client is adapted to apply parity information to the respective data segment. By forming a data segment and applying a data redundancy scheme to the data segment, the effort for data redundancy can be significantly reduced.

According to an example embodiment of the storage system, the data segment forms a RAID stripe when applying the data redundancy scheme to the data segment.

Thereby, space-efficient data redundancy schemes like RAID5/RAID6 could be applied with reduced computational effort.

According to an example embodiment of the storage system, the data segment comprises a log-structured data layout. Thereby erasure codes could be enabled without the requirement of Read-Modify-Write operations.

According to an example embodiment of the storage system, the storage client comprises compression means for compressing data segments to be written into a storage device. Thereby additional data efficiency is obtained with reduced costs per unit of data stored.

According to an example embodiment of the storage system, the storage client is adapted to directly write a data segment comprising erasure code information to the storage devices. So, in other words, the storage controllers are bypassed which can increase the storage system efficiency.

According to an example embodiment of the storage system, the storage controller is adapted to buffer information included in a data segment during said aggregation of data in order to provide backup information. Thereby, a data backup can be provided which could be used for finishing the data storage process in case of an error of the storage client.

According to an example embodiment of the storage system, the system is adapted to update information included in a data segment by relocating updated data blocks to a new data segment and sign outdated data blocks as invalid. Thereby, resource-consuming Read-Modify-Write operations (associated with traditional RAID5 or RAID6 without a log-structured data layout) could be avoided.

According to an example embodiment of the storage system, the storage client is adapted to instruct the storage controller to move a data block from one physical address to another physical address during a garbage collection process. Thereby storage space occupied by invalid data blocks could be freed by moving valid data blocks to new positions thereby freeing whole data segments for further storage operations.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 schematically illustrates an example of storage system 100. Storage system 100 comprises server computers 110, also referred to as storage clients, storage controllers 120 and storage devices 130 forming a storage array. For example, storage devices 130 can be one or more non-volatile memory express (NVMe) drives. For example, NVMe SSD drives made of Flash memory or any other type of solid state memory, including 3D-XPoint memory.

In order to exchange information between server computer 110, storage controllers 120 and one or more storage devices 130 a storage fabric or network is provided. A first portion of network 150 can be provided outside storage enclosure 140. First network portion can be a RDMA-enabled network. Each server 110 and storage enclosure 140 can comprise network interface card 111, 141. For example, a RDMA network interface card. For example, RDMA-enabled network provided between server computer 110 and storage enclosure 140 can be an RDMA-enabled Ethernet network, or InfiniBand network.

A second network portion of network 150 can be provided inside storage enclosure 140. The second network portion can comprise or can be built by a PCIe network (PCIe: Peripheral Component Interconnect Express). The second network portion can connect storage controller 120, storage devices 130 and one or more network interface cards 141 for exchange of information. Thus, server computer 110 can communicate with storage enclosure 140 using the NVMe-over-Fabrics protocol (or any variation thereof). Inside storage enclosure 140, the NVMe (over PCIe) protocol is used for accessing storage device 130. Following this architecture, storage controller 120 can access storage device 130 using NVMe (over PCIe) protocol. When server computer 110 access storage device 130, network interface card 141 translates the NVMe-over-Fabrics commands to NVMe (over PCIe) protocol and forwards commands to storage device 130. According to preferred embodiments, storage enclosure 140 can employ multiple network interface cards 141 for redundancy and high availability. Optionally, this translation can be done by specialized hardware offloads in network interface card 141.

Storage system 100 is adapted to perform control path and data path operations. In various embodiments, to improve the performance and scalability of the storage system 100, the control path and data path operations comprising the storage functions are separated. On the one hand, typical control path operations include the provisioning of resources, access control, management operations, monitoring, responding to hardware and software failures, and in general operations that do not have to be processed on a per-I/O request basis. On the other hand, data path operations are the ones that essentially implement the I/O request processing such as routing a request targeting a logical address to the correct physical address on the correct storage device, adding redundancy such as RAID parity to write requests, and more generally operations that need to be accomplished on a per-request basis.

Furthermore, the server computer 110, storage controller 120 and storage device 130 are interconnected via upper-mentioned network 150 that allows the server computer 110 to access storage device 130 directly and execute I/O operations using the physical addresses of data blocks. Similarly, storage controller 120 can access storage device 130 directly and execute I/O operations using the physical addresses of data blocks.

As shown in FIG. 1, the server computer 110 run a driver such as a rich block driver for the storage that implements data-path storage functions, while the storage controllers implement the control path functions. Such data-path storage functions can include virtualization, i.e., mapping user logical addresses (such as volume Logical Block Addresses—LBAs) to backend addresses (e.g., addresses on the NVMe drives), log-structured data organization (LSA), (optionally) computing RAID parity, (optionally) compression of logical data. So, in the present disclosure, the storage controller can only implement part of the storage function (some of the data path operations). It can run as an operating system driver within the host environment (VM or otherwise) that comprises the storage client.

Network 150 can be, for example, a telecommunications network, a local area network (LAN), a wide area network (WAN), such as the Internet, or a combination of the three, and can include wired, wireless, or fiber optic connections. Network 150 can include one or more wired and/or wireless networks that are capable of receiving and transmitting data, voice, and/or video signals, including multimedia signals that include voice, data, and video information. In general, network 150 can be any combination of connections and protocols that will support communications between server computer 110 and storage enclosure 140, and/or other computing devices (not shown in FIG. 1) within a distributed data processing environment.

Server computer 110 can be a standalone computing device, a management server, a web server, a mobile computing device, or any other electronic device or computing system capable of receiving, sending, and processing data. In other embodiments, server computers 110 can represent a server computing system utilizing multiple computers as a server system, such as in a cloud computing environment. In another embodiment, server computers 110 can be a laptop computer, a tablet computer, a netbook computer, a personal computer (PC), a desktop computer, a personal digital assistant (PDA), a smart phone, or any other programmable electronic device capable of communicating with server computer 110 and other computing devices (not shown) within distributed data processing environment, via network 150. In various embodiments, there can be one or more server computers in the data processing environment.

In another embodiment, server computer 110 represents a computing system utilizing clustered computers and components (e.g., database server computers, application server computers, etc.) that act as a single pool of seamless resources when accessed within the distributed data processing environment. Server computer 110 includes disease progression component 121 and database 124. In other embodiments, server computers 110 can be a computer or other device connected to a computer network. A network host may, offer information resources, services, and applications to users or other nodes on the network. A network host is a network node that is assigned a network layer host address. Server computer 110 can include internal and external hardware components, as depicted and described in further detail with respect to FIG. 3.

Figure 2:
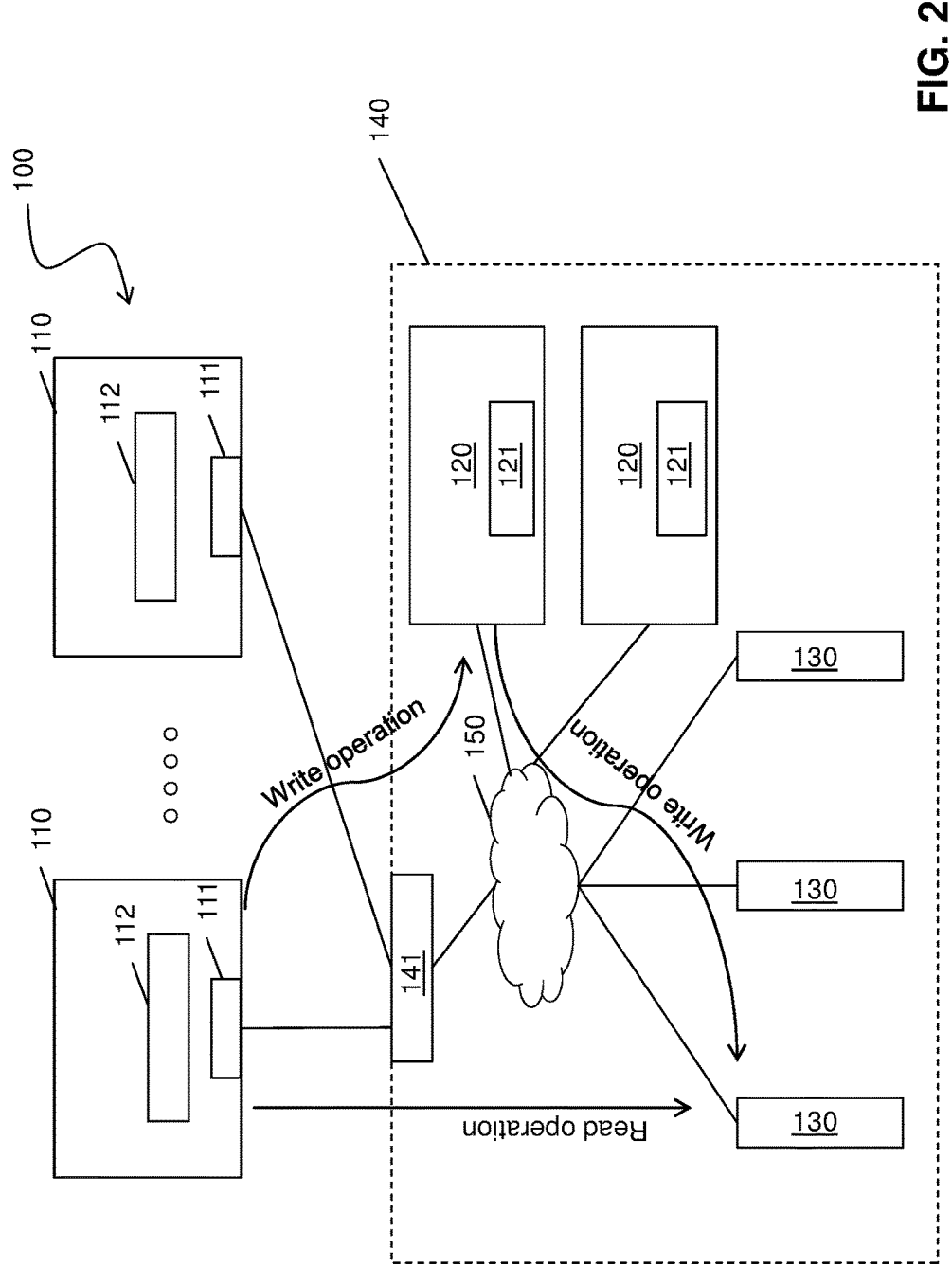
FIG. 2 illustrates a basic and schematic illustration of a storage system with a data redundancy engine included in the storage controller.

FIG. 2 shows an embodiment of a storage system 100, which comprises a read-optimized architecture and an efficient implementation of data redundancy. In the following, only differences with respect to the embodiment described before are explained. It should be noted, that the features described previously in conjunction with the embodiment of FIG. 1 also apply to the following embodiments of FIGS. 2 and 3. Compared to the storage system described in FIG. 1, a first main difference between FIGS. 1 and 2 is the different handling of read and write I/O-operations. In various embodiments, storage system 100 is adapted to directly provide read operations from the server 110 to storage device 130 thereby bypassing storage controller 120. So, in other words, the read data path does not include storage controller 120. In other embodiments, the write operations can be handled via storage controller 120, i.e. storage controller 120 at least partially performs operations when writing data from the server computer 110 to storage device 130. Therefore, as shown in FIG. 2, storage controller 120 is included in the write data path.

According to the exemplary embodiment, storage controller 120 includes data redundancy engine 121, for example a RAID engine. Data redundancy engine 121 can comprise a piece of software included in redundancy engine 121 and can be additionally supported by hardware components, e.g. a hardware component for computing an erasure code (e.g. parity information), see FIG. 7. For example, the data redundancy engine 121 can be adapted to implement a data redundancy scheme higher than RAID 1, for example RAID5, RAID6 or any other erasure code which provides a data redundancy level above RAID 1. According to embodiments, RAID engine is implemented using software control logic assisted by a CPU-efficient data path utilizing user-space I/O and potentially using special hardware for computing the parity required for RAID5, RAID6 or any other erasure code which provides a data redundancy level above RAID 1.

In addition, storage controller 120 can be responsible for upper-mentioned control path operations such as volume management, host connectivity and access control, space allocation, reservations, high availability coordination, etc. In various embodiments, storage controller 120 can also be responsible for the write data path, where a RAID engine is implemented using software control logic assisted by a CPU efficient data path utilizing user-space I/O and potentially using special hardware for computing the parity required for RAID5, RAID6 or any other erasure code of choice.

On the server, driver entity 112, specifically a rich block driver implements data-path storage functions such as logical address to physical address translation, handling of read I/O operations directly to storage device 130, handling of write I/O operations to storage controller 120, updating storage controller 120 upon observed failures of storage device 130, receiving and caching updates from storage controller 120 with respect to capacity allocation, reservations and configuration changes. In addition, driver entity 112 can have knowledge about the potential existence of multiple storage enclosures 140 and can be adapted to create volumes and stripe data across the different enclosures.

Storage system 100 is advantageous because it provides high storage efficiency (due to the use of an efficient redundancy scheme such as RAID5 or RAID6 compared to RAID0/RAID1), while at the same time maintaining the high performance for read operations, as the read data path processing is completely offloaded from storage controller 120. In addition, when compared to the storage architecture described before based on FIG. 1, the throughput of storage controller 120 will be higher, as their processing resources will be exclusively dedicated to serving the write data path.

Figure 3:
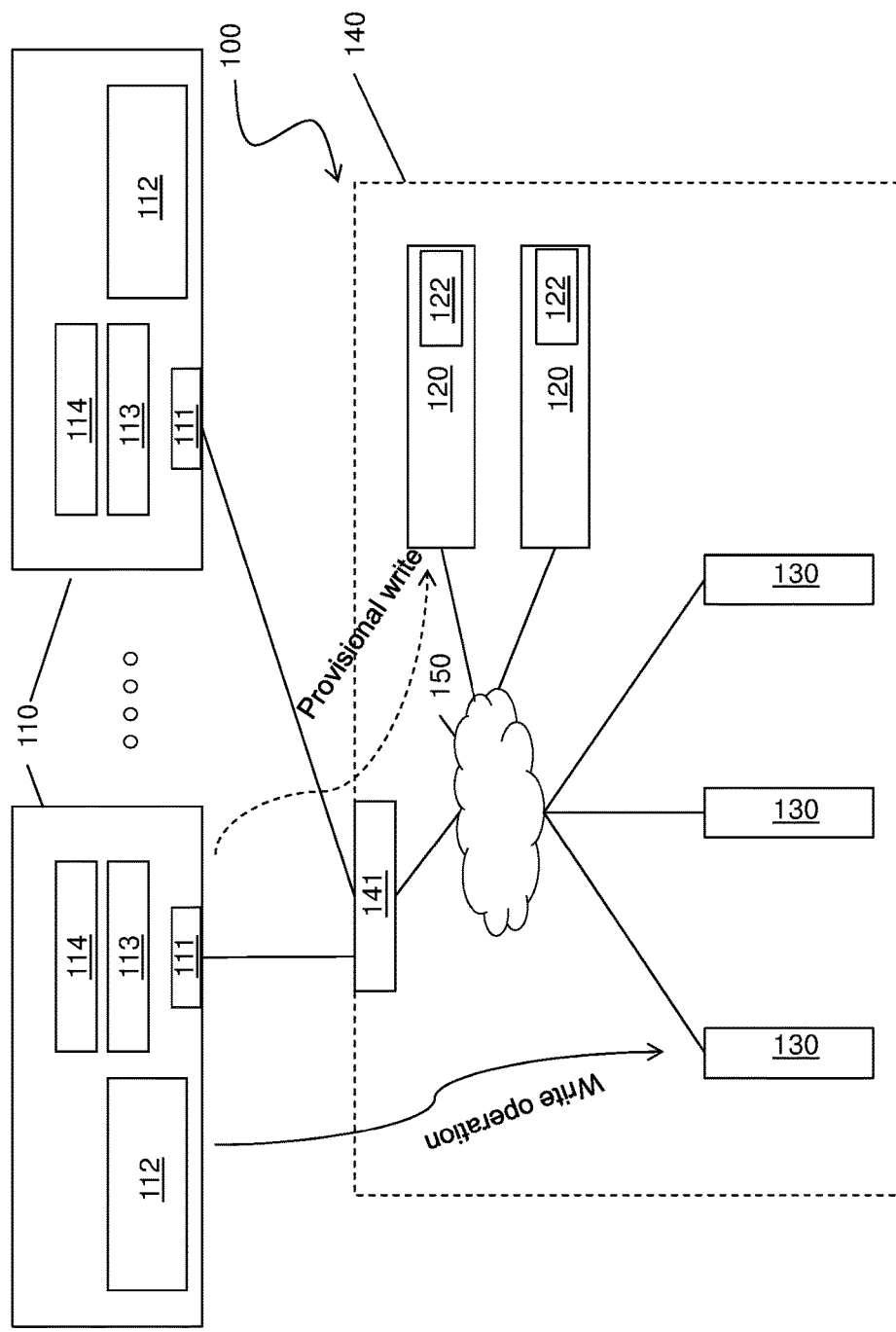
FIG. 3 illustrates a basic and schematic illustration of a storage system with a data redundancy engine included in the storage client.

FIG. 3 shows a further embodiment of storage system 100 with write-optimized scale-out architecture. The main difference with respect to the embodiment described before in conjunction with FIG. 2 is that the data redundancy engine is included in the server 110. So, in other words, the server computer 110 are adapted to provide a data redundancy scheme to the data to be written to storage device 130. The data redundancy engine provides a space-efficient data redundancy scheme higher than RAID 1 or equivalent data redundancy schemes.

In order to provide an effective data redundancy handling, the server computer 110 are adapted to form segments of data, wherein each segment of data is the equivalent of a RAID-stripe. In other words, the storage client is adapted to aggregate data in order to form data segments. Each data segment can contain multiple data blocks. According to embodiments, the size of a segment can be in the range of ten to multiple hundreds of MBs in size. More in detail, each segment can be a multiple of logical erase block size of the underlying storage device 130. The server 110 can comprise a buffer 113 into which data are written by a user or an application for aggregation and forming a data segment. If the segment is completed, i.e. all data blocks of a segment are occupied by data, erasure code, specifically RAID parity information is calculated by the server. Thereby, a RAID stripe can be generated. After generating RAID stripe, RAID stripe can be written to storage device 130. Write operation can bypass the one or more storage controllers 120. In case of a RAID5/RAID6, in various embodiments, data redundancy scheme, data included in the RAID stripe can be distributed over multiple storage devices 130.

For performing data-path operations, each server 110 can comprise a driver entity 112, specifically a rich host block driver. Driver entity 112 can make use of available host resources such as CPU and memory buffers to process data-path operations for read and write requests. Driver entity 112 can optionally make use of host hardware resources for compression and parity computation. For example, the server 110 can comprise a hardware XOR engine or another hardware engine depending on the redundancy scheme used.

Driver entity 112 can use a log-structured data (LSA) layout. Using LSA layout, data is packed into logical segments according to a global log structure that can span multiple storage devices. As data is written out-of-place, a dynamic mapping can be maintained in order to keep track of current data placement. By using log-structured data approach, an update of already stored data can be performed similar to upper-mentioned write operation. During an update operation, updated data can be written out-of-place to a different RAID-stripe and the existing RAID stripe (or only certain data blocks of RAID stripe) can be marked as invalid. Thereby Read-Modify-Write-operations in storage system 100 can be avoided.

Due to the log-structured data layout, which entails out-of-place writes, driver entity 112 will eventually need to perform garbage collection in order to free up the space occupied by obsolete data (i.e. old copies of data blocks that have been updated in the meantime and have been written to a different address). A mapping table can be provided which comprises information regarding valid/invalid data blocks. As part of the garbage collection process, log-structured data segments have their valid data blocks relocated to a new segment, which entails reading the data blocks from their old physical location and writing them to a new physical location. Thereby, data segments which comprise only a few valid data blocks can be freed up. Invalid data blocks can simply get discarded without the need to perform I/O operations. So more in detail, driver entity 112 does not have to read the valid blocks over the network and then write them to a new physical location over the network. Instead, it directly instructs storage controller 120 to perform that action. For example, storage controller 120 can provide a 'move' operation which can be exploited by the server 110. The server 110, specifically driver entity 112 of the server can instruct storage controller 120 to move the data from one physical address to another. The two physical addresses can or cannot reside on the same storage device 130.

As shown in FIG. 3, the server 110 can perform a provisional write operation to storage controller 120. Provisional write operation can be performed in parallel to the aggregation process performed by the server 110 for forming a data segment which is equivalent to a RAID stripe. Using that temporary write operation, the risk of loss of data due to a server failure is reduced.

In order to perform provisional write operation, storage device 130 is equipped with non-volatile memory. Non-volatile memory can be provided by battery-backed DRAM, Flash-backed DRAM, Phase-Change Memory, 3DXP memory or any other type of non-volatile memory. Non-volatile memory 122 can be partitioned into multiple partitions. Each partition can be assigned to each one of the server computer 110. Driver entity 112 of the respective server 110 can access partition using an RDMA-based network protocol such as NVMe-over-Fabrics. RDMA-based network protocol can enable access with high throughput and low latency.

As mentioned before, the driver entity can buffer user/application writes until a RAID-stripe worth of data has been accumulated. To ensure that these writes are not lost in the event of a server failure, driver entity 112 copies the written data to one or more storage controller non-volatile memory partitions assigned to it, before acknowledging the user write. Additional write operation can be a temporary write or provisional write operation. The provisional write can include enough information about the logical and physical location of the data. In the event of a server failure, e.g. a power failure, storage controller 120 will complete the write to storage device 130 as required. Otherwise (i.e. in case of no failure situation), once driver entity 112 of the server 110 has accumulated enough data to create a full RAID stripe, it will write the whole stripe to the storage device and then instruct storage controller 120 to delete all the provisional writes from the respective non-volatile memory partition(s).

The logical-to-physical mapping can be maintained by driver entity 112. Each data segment that is written to storage device 130 encapsulates the logical-to-physical mapping entries of all the blocks contained therein. In addition, also the provisional writes to storage controller 120 comprise logical-to-physical mapping entries. Thereby, the mapping metadata are always safe and mapping tables can be reconstructed by reading the appropriate metadata entries from storage device 130 and the non-volatile memory on storage controller 120. Optionally, driver entity 112 does not maintain the entire mapping in its memory, but only caches the desired number of metadata entries.

In order to enhance the data efficiency of storage system 100, the driver entity can perform data compression before placing the data in the currently open segment. To achieve high performance, the server 110 can comprise compression means 114, specifically compression hardware which performs compression task. Driver entity 112 can use compression hardware to offload the compression workload. Example experiments with data compression on enterprise data have shown that a compression ratio of 2×-4× is expected on average, which means that the proposed storage architecture would achieve 2×-4× lower cost per unit of data stored.

Figure 4:
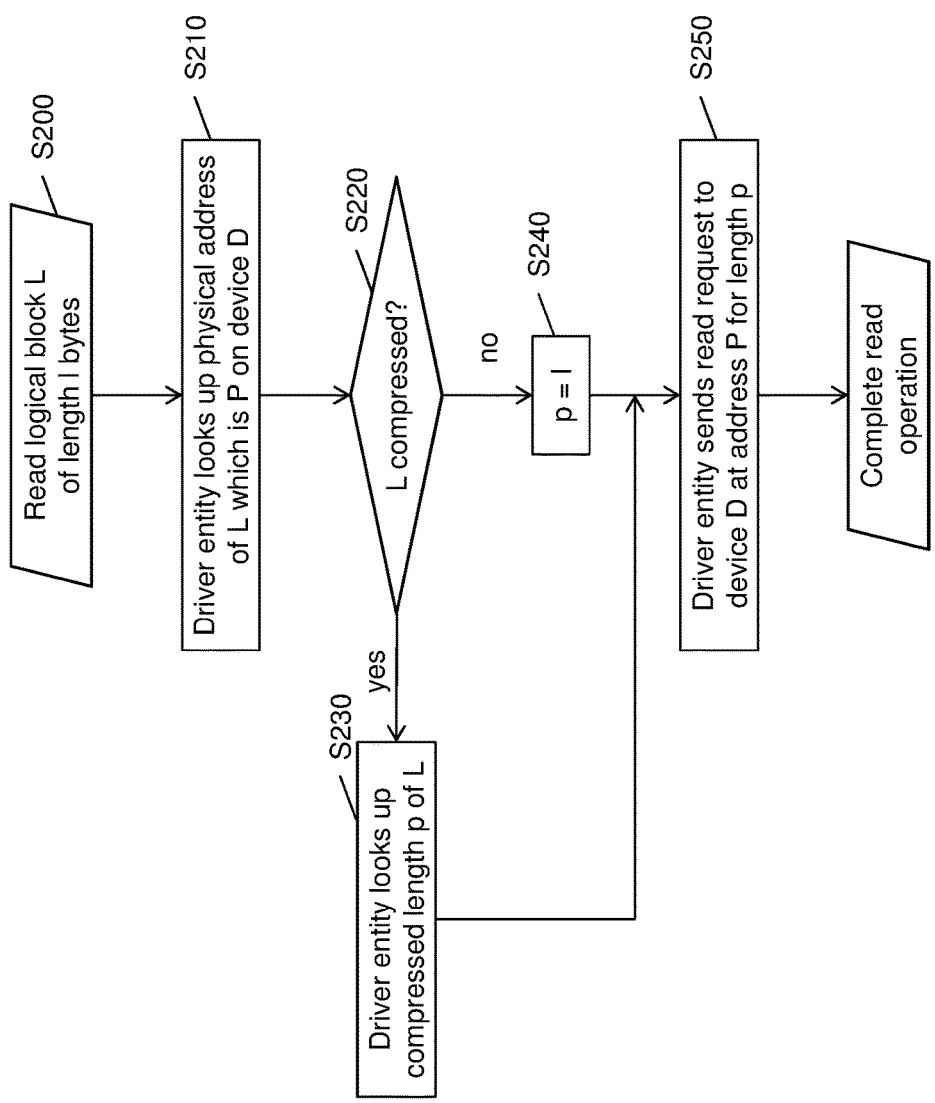
FIG. 4 schematically illustrates the steps performed during a read operation.

FIG. 4 schematically illustrates an example read operation performed by a server 110 based on a flow chart. After initiating the read operation of a logical block L with a length of 1 bytes (S200), driver entity 112 determines the physical address of L which can be P (i.e. P is an address of a physical block) on storage device D (S210).

In the next step, driver entity 112 determines whether L is compressed (S220) in order to determine the correct length of data to be read. If L is compressed, driver entity 112 determines (Yes), respectively, looks up the compressed length of L which is p (S230). If no compression is used in storage system 100 (No), the data length to be read is equal to 1 (S240). After determining the data length to be read, driver entity 112 sends a read request to storage device D at address P for length p (S250).

Figure 5:
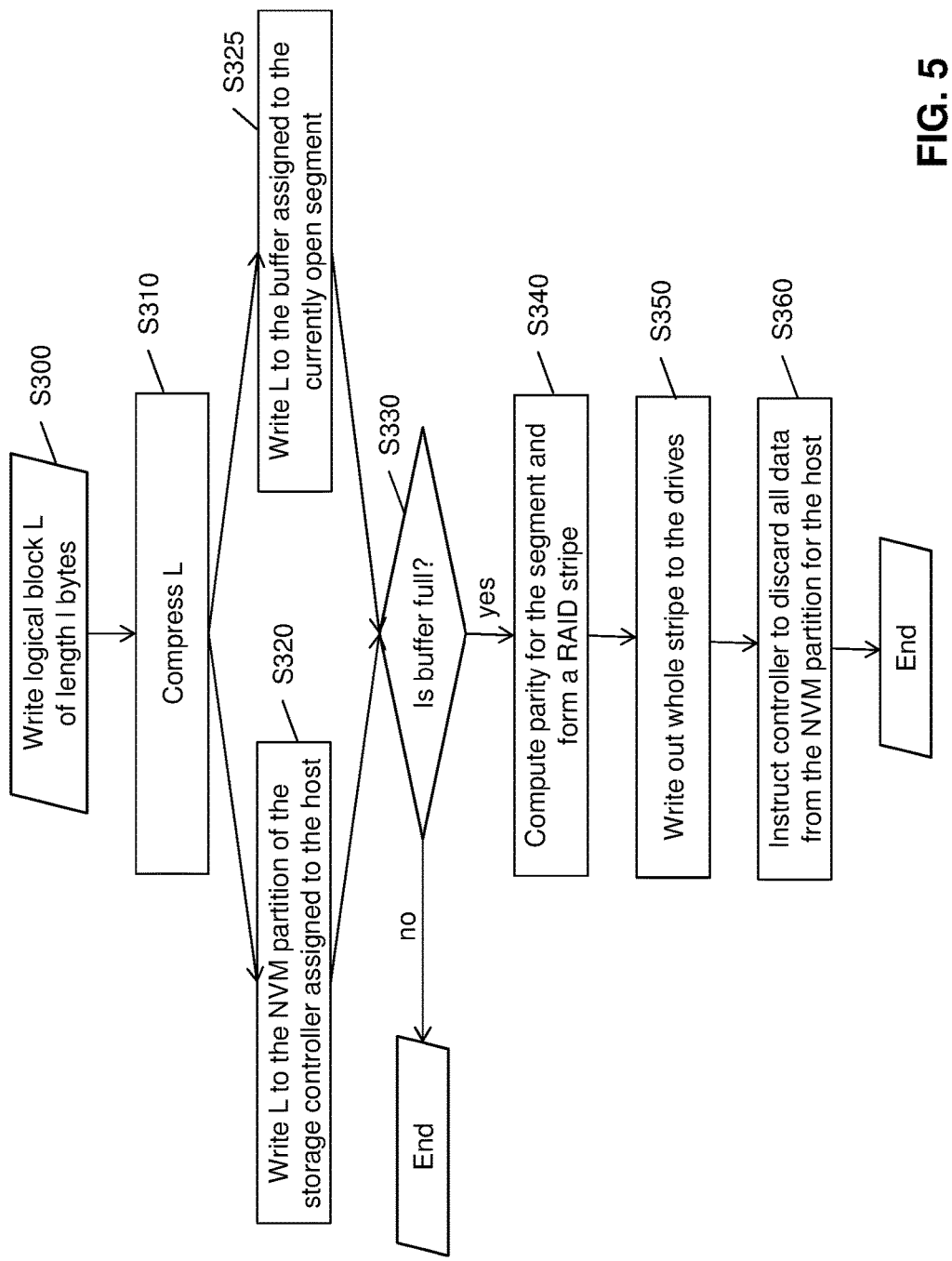
FIG. 5 schematically illustrates the steps performed during a write operation.

FIG. 5 schematically illustrates an example write operation performed by a server 110 based on a flow chart. After initiating the write operation of a logical block L with a length of 1 bytes (S300), block L is compressed (S310). After compressing the data block, the compressed data block L is written to the partition (e.g. NVM partition) of storage controller 120 which is associated with the server 110 which initiated the write operation (S320) (upper-mentioned provisional write operation). In parallel, the data block is written to the currently open data segment in order to aggregate data for forming a full RAID stripe (S325). Subsequently, the driver entity determines whether the buffer which is used for aggregating data is full, i.e. a data segment is completely filled up with data (S330). If the data segment is not completely full (No), the write operation is finished. If the data segment is completely filled up with data (Yes), an erasure code, specifically parity information is calculated for the data segment thereby generating a RAID stripe (S340). After building the RAID stripe, the whole RAID stripe is written to storage device 130 (S350) and storage controller 120 is instructed by driver entity 112 to discard all data from the NVM partition associated with the server 110 which initiated the write operation (S360).

Figure 6:
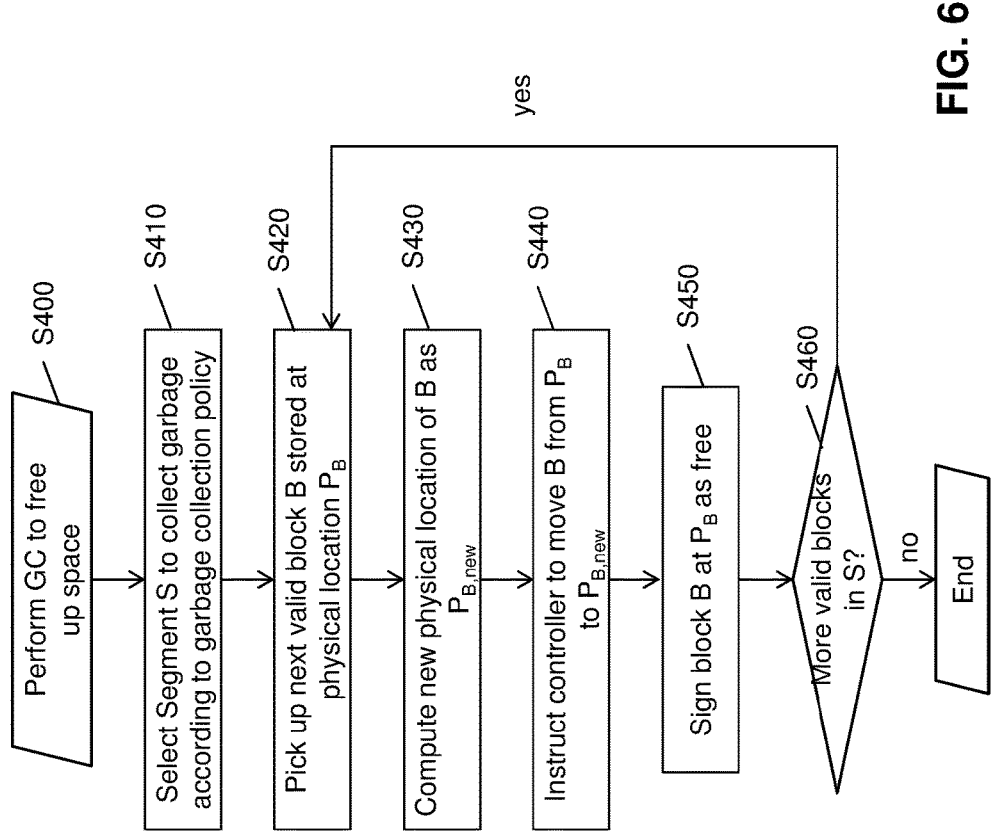
FIG. 6 schematically illustrates the steps performed during a garbage collection process.

FIG. 6 schematically illustrates an example garbage collection process initiated by a server 110 based on a flow chart. As mentioned before, in order to avoid Read-Modify-Write operations in storage system 100, update of data is not performed by updating data comprised in a certain data block but updated data are written to a new, valid data block and outdated data are identified as invalid. For indicating data blocks as valid/invalid, a mapping table is provided and continuously updated. However, updating procedure can lead to invalid data blocks which are no longer required. In order to remove obsolete data blocks, a garbage collection operation is provided.

Subsequent to initiating the garbage collection process (GC) (S400), a data segment S (being equivalent with a RAID stripe) is selected for performing garbage collection on data segment. The garbage collection process can be performed according to certain rules, in generally based on a certain garbage collection policy (S410). The garbage collection process can be initiated and coordinated by the host driver, which decides which segments should be garbage collected and when. For each segment undergoing garbage collection, the host driver is in the position to identify which data is stale (invalid) and can, therefore be discarded, and which data is valid and must, therefore, be relocated to another segment. However, the actual data movement required for these relocations cannot involve the host. Rather, the host driver can instruct and coordinate this data movement using a special relocation command which can be executed by the storage controller. That is, preferably, the storage controller implements the data relocation from one NVMe drive to another (or even between different addresses on the same drive) as instructed by the host driver by means of the special relocation command.

In various embodiments, in order to free-up whole data segments, the garbage collection process searches for valid data blocks and moves valid data blocks to a new location in order to obtain a data segment which comprises only invalid data blocks. Such data segment can be overwritten without losing valid data blocks. Within the selected segment S, the process can search for valid data blocks and pick up such valid data block B (S420). In order to relocate the valid block, a new physical location $P_{B,new}$ is computed for valid data block B (S430). After calculating a new physical location $P_{B,new}$, storage controller 120 is instructed to move valid data block B from the old physical location $P_B$ to new physical location $P_{B,new}$ (S440) and the data block B at the old physical location $P_B$ is marked as invalid/free (S450). In order to free-up the whole segment, a search for further valid data blocks in segment S is conducted (S460). If there are further valid data blocks in segment S, the process returns to step S420 and picks up the next valid data block for data movement. If there are no further valid data blocks in the data segment S, the process can stop or can proceed with the next segment being only partially filled with valid data blocks.

Summing up, a system and a method for data storage have been presented. System/method is advantageous because the storage architecture provides a high scalability paired with the ability to implement an efficient data redundancy scheme.

Figure 7:
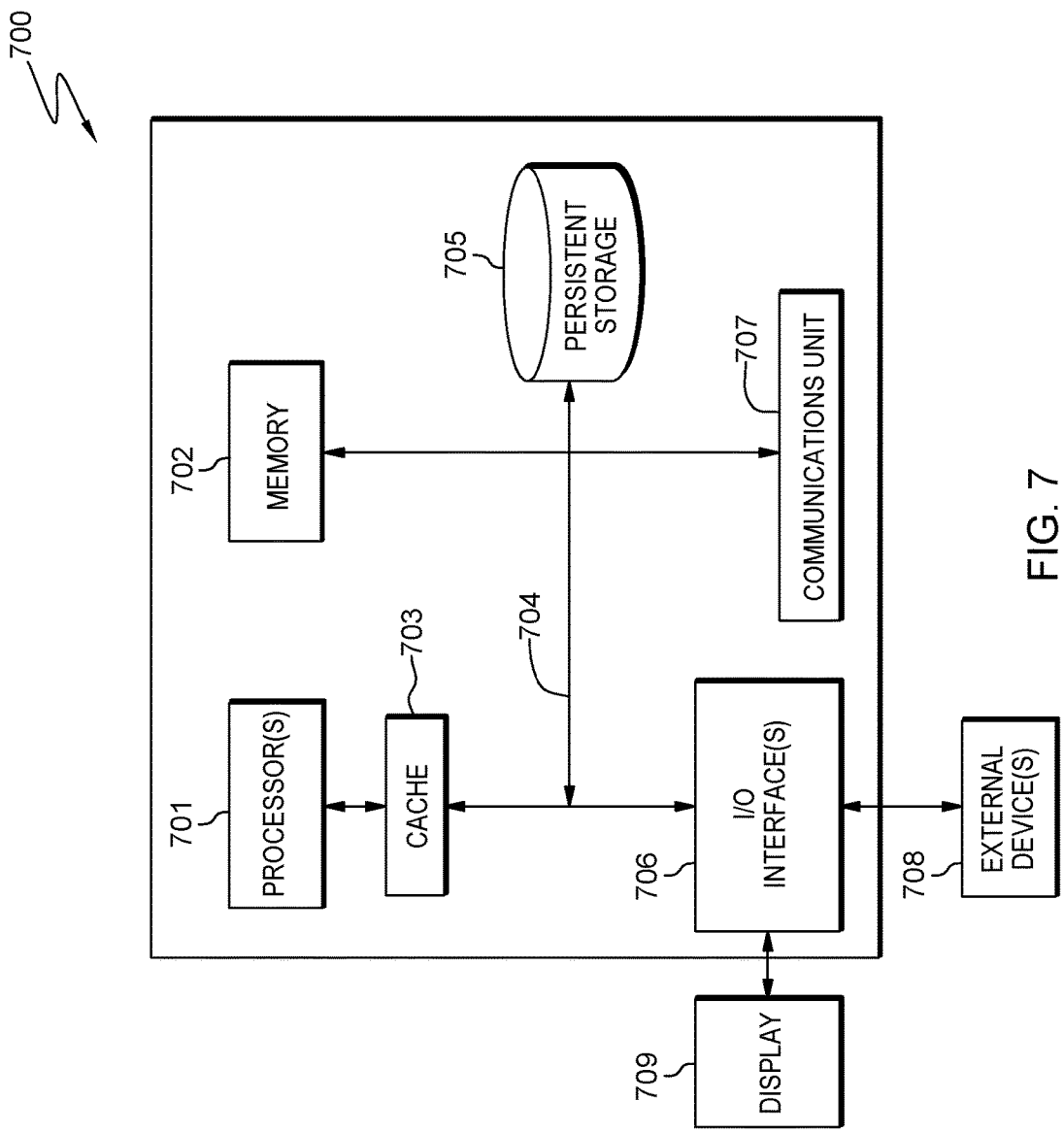
FIG. 7 depicts a block diagram of components of the server computer executing the intelligent mapping program within the distributed data processing environment of FIG. 1, in accordance with an embodiment of the present invention.

FIG. 7 depicts computer system 700, where server computer 120 represents an example of computer system 700 that includes disease progression component 122. The computer system includes processors 701, cache 703, memory 702, persistent storage 705, communications unit 707, input/output (I/O) interface(s) 706 and communications fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processors 701 by holding recently accessed data, and data near recently accessed data, from memory 702.

Program instructions and data used to practice embodiments of the present invention may be stored in persistent storage 705 and in memory 702 for execution by one or more of the respective processors 701 via cache 703. In an embodiment, persistent storage 705 includes a magnetic hard disk drive. Alternatively, or in addition to a magnetic hard disk drive, persistent storage 705 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data used to practice embodiments of the present invention may be downloaded to persistent storage 705 through communications unit 707.

I/O interface(s) 706 enables for input and output of data with other devices that may be connected to each computer system. For example, I/O interface 706 may provide a connection to external devices 708 such as a keyboard, keypad, a touch screen, and/or some other suitable input device. External devices 708 can also include portable computer readable storage media such as, for example, thumb drives, portable optical or magnetic disks, and memory cards. Software and data used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

What is claimed is:

1. A storage system comprising:
   one or more storage controllers communicatively connected to a network, wherein the one or more storage controllers implement the control path functions to perform operations in the control path;
   two or more storage devices communicatively connected to the network; and
   two or more storage clients communicatively connected to the network;
   wherein information flows between the storage controllers, the two or more storage devices, the two or more storage clients, and the network, wherein the two or more storage clients are adapted to provide data-path-storage commands toward the two or more storage devices through the network bypassing the two or more storage controllers, and wherein the storage system is adapted to provide data redundancy using a data redundancy scheme higher than RAID 1.

2. The storage system of claim 1, wherein the storage controller further comprises a data redundancy engine for implementing the data redundancy scheme, and wherein the data redundancy engine further comprises a RAID engine implementing a RAID 5 redundancy scheme or a RAID 6 data redundancy scheme.

3. The storage system of claim 1, wherein data-path-storage commands referring to a read operation are directly provided from the storage client to the storage device whereas data-path-storage commands referring to a write operation are provided from the storage client to the storage device via the storage controller in order to implement the data redundancy scheme to data to be written into the storage.

4. The storage system of claim 2, wherein the data redundancy engine further comprises hardware portion for calculating an erasure code.

5. The storage system of claim 2, wherein the data redundancy engine further comprises hardware portion adapted to calculate parity information for implementing the RAID 5 redundancy or the RAID 6 data redundancy scheme.

6. The storage system of claim 1, wherein data-path-storage commands referring to a read operation are directly provided from the storage client to the storage device, and data-path-storage commands referring to a write operation are provided from the storage client to the storage device from the storage controller.

7. The storage system of claim 1, wherein the storage clients comprise a data redundancy engine for implementing the data redundancy scheme.

8. The storage system of claim 7, wherein the data redundancy engine of the storage clients comprises a RAID engine implementing RAID 5 or RAID 6 data redundancy scheme and, wherein the data redundancy engine comprises a hardware portion for calculating an erasure code, specifically for calculating parity information for implementing RAID 5 or RAID 6 data redundancy scheme.

9. The storage system of claim 1, wherein the storage client is adapted to aggregate data in order to form data segments, wherein the storage client is adapted to apply a data redundancy scheme to a respective data segment, specifically, the storage client is adapted to apply parity information to the respective data segment.

10. The storage system of claim 9, wherein the data segment forms a RAID stripe.

11. The storage system of claim 9, wherein the data segment comprises a log-structured data layout.

12. The storage system of claim 7, wherein the storage client comprises compression means for compressing data segments to be written into a storage device.

13. The storage system of claim 7, wherein the storage client is adapted to directly write a data segment comprising erasure code information to said storage devices.

14. The storage system of claim 9, wherein the storage controller is adapted to buffer information included in a data segment during the aggregation of data in order to provide backup information.

15. The storage system of claim 9, being adapted to update information included in a data segment by relocating updated data blocks to new data segment and sign outdated data blocks as invalid.

16. The storage system of claim 15, wherein the storage client is adapted to instruct the storage controller to move a data block from one physical address to another physical address during a garbage collection process.

17. A method for data storage in a storage system comprising one or more storage controllers, two or more storage devices and two or more storage clients, the storage controllers, the storage devices and the storage clients being coupled via a network in order to exchange information between the storage controllers, the storage devices and the storage clients, the method comprising:
   providing, by one or more processors, data-path-storage commands directly to the two or more storage devices by the two or more storage clients and bypassing the one or more storage controllers via the network, wherein the data-path-storage commands are initiated by the two or more storage clients and executed by the one or more storage controllers; and
   implementing, by the one or more processors, data redundancy using a data redundancy scheme higher than RAID 1.

18. The method of claim 17 further comprising:
   preforming, by the one or more processors, garbage collection process to free up space;
   selecting, by the one or more processors, a data segment to collect garbage according to garbage collection policy; and
   picking, by the one or more processors, a next valid data block.

19. The method of claim 18 further comprising:
   computing, by the one or more processors, a new physical location for the data block.

20. A computer program product for data storage, the computer program product comprising a computer readable storage medium having program instructions embodied therewith, the program instructions being executable by a processor, the computer program product comprising:
   providing, by one or more processors, data-path-storage commands directly to two or more storage devices by two or more storage clients and bypassing the storage controllers via the network, wherein the data-pathstorage commands are initiated by the two or more storage clients and executed by the one or more storage controllers; and program instructions to implement data redundancy using a data redundancy scheme higher than RAID 1.

\* \* \* \* \*